(12) United States Patent
Ayambem et al.

(10) Patent No.: US 10,155,865 B2
(45) Date of Patent: *Dec. 18, 2018

(54) WATER-RESISTANT PRODUCTS USING A WAX EMULSION

(71) Applicant: Henry Company LLC, El Segundo, CA (US)

(72) Inventors: Amba Ayambem, Glenmoore, PA (US); Alex Gonzalez, Springfield, PA (US); John Dobson, West Chester, PA (US)

(73) Assignee: Henry Company, LLC, El Segundo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,236

(22) Filed: Oct. 26, 2017

(65) Prior Publication Data

US 2018/0044526 A1    Feb. 15, 2018

Related U.S. Application Data

(60) Division of application No. 14/567,018, filed on Dec. 11, 2014, now Pat. No. 9,828,504, and a continuation-in-part of application No. 14/278,919, filed on May 15, 2014, now abandoned.

(60) Provisional application No. 61/953,640, filed on Mar. 14, 2014, provisional application No. 61/946,396, filed on Feb. 28, 2014, provisional application No. 61/942,490, filed on Feb. 20, 2014, provisional application No. 61/914,850, filed on Dec. 11, 2013.

(51) Int. Cl.
*C09B 67/00* (2006.01)
*C08L 91/06* (2006.01)

(52) U.S. Cl.
CPC .................... *C08L 91/06* (2013.01)

(58) Field of Classification Search
CPC ....................................................... C08L 91/06
See application file for complete search history.

(56) References Cited

U.S. PATENT DOCUMENTS

| | | | |
|---|---|---|---|
| 2,019,758 A | 11/1935 | Macrill | |
| 3,477,512 A | 11/1969 | Siegele | |
| 3,563,786 A * | 2/1971 | Pierard | C04B 41/52 427/294 |
| 3,715,327 A | 2/1973 | Feit | |
| 4,454,267 A | 6/1984 | Williams | |
| 5,118,732 A | 6/1992 | Loth et al. | |
| 5,437,722 A | 8/1995 | Borenstein | |
| 6,017,588 A | 1/2000 | Watanabe et al. | |
| 6,033,736 A | 3/2000 | Perlman et al. | |
| 6,673,144 B2 | 1/2004 | Immordino et al. | |
| 6,712,897 B2 * | 3/2004 | Ayambem | C04B 40/0028 106/189.1 |
| 6,936,099 B2 * | 8/2005 | Ayambem | C04B 26/02 106/672 |
| 7,052,544 B2 | 5/2006 | Langford | |
| 8,202,363 B2 | 6/2012 | Wanting | |
| 9,828,504 B2 * | 11/2017 | Ayambem | C08L 91/06 |
| 9,834,680 B2 * | 12/2017 | Ayambem | G05D 1/104 |
| 9,964,628 B2 * | 5/2018 | Ayambem | G05D 1/104 |
| 2005/0119388 A1 | 6/2005 | Langford | |
| 2005/0229519 A1 * | 10/2005 | Colbert | C04B 26/06 52/416 |
| 2006/0048684 A1 | 3/2006 | Bonetto | |
| 2007/0232736 A1 | 10/2007 | Liling | |
| 2008/0141909 A1 | 6/2008 | Immordino et al. | |
| 2008/0190062 A1 | 8/2008 | Engbrecht et al. | |
| 2008/0216715 A1 | 9/2008 | Langford | |
| 2010/0083879 A1 | 4/2010 | Francis | |
| 2010/0116406 A1 * | 5/2010 | Mahoney | C04B 40/0039 156/39 |
| 2011/0005431 A1 | 1/2011 | Wanting | |
| 2012/0216722 A1 | 8/2012 | Stuart et al. | |
| 2012/0263963 A1 | 10/2012 | Mahoney et al. | |
| 2016/0115319 A1 | 4/2016 | Ayambem et al. | |

FOREIGN PATENT DOCUMENTS

| | | |
|---|---|---|
| JP | 2004-291526 | 10/2004 |
| JP | 2014-214306 | 11/2014 |
| WO | WO 84/02531 | 7/1984 |
| WO | WO 2013/113457 | 8/2013 |

OTHER PUBLICATIONS

International Search Report and the Written Opinion for International Application No. PCT/US14/38244, dated Sep. 23, 2014.

* cited by examiner

*Primary Examiner* — Hannah J Pak
(74) *Attorney, Agent, or Firm* — Baker & Hostetler LLP

(57) ABSTRACT

Embodiments of the present disclosure are directed to water-resistant products which contain a wax emulsion, or silicones, or siliconates, or fluorinated compounds, or stearates, or combinations thereof. In some embodiments, the compound can be used to provide enhanced moisture resistance to joints, or holes such as screw holes or nail holes, in a wallboard.

16 Claims, 2 Drawing Sheets

WATER-RESISTANT PRODUCTS USING A WAX EMULSION

CROSS REFERENCE TO RELATED APPLICATIONS

The present application is a divisional of U.S. application Ser. No. 14/567,018 filed Dec. 11, 2014, which is a continuation-in-part of U.S. application Ser. No. 14/278,919, filed May 15, 2014, which claims priority from U.S. Provisional Application Ser. No. 61/953,640, filed Mar. 14, 2014; U.S. Provisional Application No. 61/946,396, filed Feb. 28, 2014; U.S. Provisional Application No. 61/942,490, filed Feb. 20, 2014; and U.S. Provisional Application 61/914,850, filed Dec. 11, 2013. The entire contents of these applications are hereby incorporated by reference herein.

TECHNICAL FIELD

Water-resistant products, such as joint compounds, using a wax emulsion are disclosed.

BACKGROUND

Wax emulsions have been used in composite wallboard (e.g., gypsum wallboard) for many years. For example, wax emulsions sold under the trade name AQUALITE® by Henry Company, and several wax emulsion formulations are disclosed in the prior art, such as U.S. Pat. No. 5,437,722.

Gypsum is employed in a gypsum panel or board product known as wallboard which is widely used as a structural building panel. Gypsum products may be produced by mixing anhydrous calcium sulfate or calcium sulfate hemihydrate with water and allowing the mixture to hydrate or set as calcium sulfate dihydrate, which is relatively hard. Gypsum wallboard may comprise a panel-like core of set gypsum sandwiched between a pair of paper liners which form the exposed outer surfaces of the wallboard. Fiberglass liners have also been used. In many applications wallboard is exposed to water. A problem with set gypsum is that it absorbs water, and such absorption reduces the strength of the wallboard.

Further, in order to achieve a smooth, visually appealing surface, the joints between boards, cracks, screw holes, and/or nail holes must be concealed. Conventional wallboard joint compounds are commonly used to cover and finish gypsum wallboard joints, cornerbead, and screw or nail holes. Joint compounds can be spread over mesh or tape used to connect wallboards. It may also be used to patch and texture interior walls.

The intrusion of water through wall spaces, either through prolonged direct contact or via high humidity, has a debilitating effect (mold and structural damage) on standard wall systems. It is for this reason that moisture resistant wallboard, passing ASTM C473, was developed. An integral part of the wall system is the tape joint compound which, so far, has no accepted standards for water resistance.

Some specially formulated gypsum wallboards (also called "Green" boards) contain a water repellent additive such as a wax emulsion to impart the added functionality of water resistance to the board. While such "green" gypsum wallboards meet strict water repellency performance requirements (ASTM C473), there are no such requirements and indeed, no ready-mix joint compound that offers commensurate water repellency. Consequently, the ready-mixed joint compound is a severe vulnerability in existing wall systems where protection against water damage is crucial.

The result of water seepage through joint compound to the studs on the other side of the wall ultimately has devastating structural and microbial implications for the wall system, first by absorption of the seeped water into the wood studs followed by their swelling and deformation (leading to expensive structural problems) and then, the creation of a fertile ground for rapid mold growth. Conventional ready mixed joint compound is therefore a weak link in the long term microbial resistance and integrity of the wall system.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Disclosed herein are embodiments of a water-resistant joint compound which can comprise water, preservative, and wax emulsion, or silicone, or siliconate, or fluorinated compound, or stearate, or combinations thereof.

In some embodiments, the joint compound can comprise a wax emulsion and can have a contact angle of about 90 to about 130 degrees, a pH below 12, and a Cobb value of about 1.0 to about 200 grams per square meter.

In some embodiments, the joint compound can further comprise about 20 to about 55 wt. % water, about 0.02 to about 1.0 wt. % preservatives, about 10 to about 50 wt. % calcium carbonate, about 0.0 to about 10% mica, about 0.0 to about 10 wt. % attapulgite clay, about 0.0 to about 10 wt. % talc, about 0.0 to about 40 wt. % perlite, about 0.0 to about 10 wt. % polyethylene oxide, about 0.0 to about 10 wt. % polyether siloxane, about 0.1 to about 20 wt. % wax emulsion, about 0.5 to about 10 wt. % latex binder, and about 0.1 to about 8.0 wt. % cellulose ether thickener.

In some embodiments, the joint compound can further comprise a rheology modifier, a binder, a thickener, and a filler. In some embodiments, the joint compound can further comprise calcium carbonate, or cristobalite, or a microroughened filler, or gypsum, or mica, or clay, or thickener, or a latex binder, or talc, or perlite, or expanded perlite, or combinations thereof. In some embodiments, the joint compound can comprise a wax emulsion which can comprise water, polyvinyl alcohol, paraffin wax, or montan wax, or synthetic wax, or combinations thereof, a base, and a dispersant.

In some embodiments, the joint compound can comprise wax emulsion, the wax emulsion can comprise paraffin wax, or montan wax, or carnauba wax, or sunflower wax, or rice wax, or tallow wax, or a wax containing organic acids and/or esters, or a emulsifier containing a mixture of organic acids such as stearic acid and/or esters, or combinations thereof. In some embodiments, the joint compound can comprise wax emulsion, the wax emulsion can comprise synthetic wax including polyethylene glycol or methoxypolyethylene glycol, or both polyethylene glycol and methoxypolyethylene glycol. In some embodiments, the joint compound can comprise synthetic wax at about 0.1% to about 8% of the joint compound dry weight.

In some embodiments, the joint compound can comprise wax emulsion stabilized with polyvinyl alcohol. In some embodiments, the joint compound can have a pH below 9. In some embodiments, the joint compound can have a contact angle of about 60 to about 130 degrees. In some embodiments, the joint compound can be generally hydrophobic and can have a contact angle of about 110 to about 130 degrees. In some embodiments, the joint compound can have a Cobb value of about 1.0 to about 200 grams per square meter. In some embodiments, the joint compound can have a Cobb value of about 65 grams per square meter.

In some embodiments, the joint compound can comprise wax emulsion and silicones, or siloxanes, or siliconates, or fluorinated compounds, or stearates, or combinations thereof. In some embodiments, the joint compound can further comprise surface micro-roughened fillers.

Also disclosed herein is a method of making a water-resistant joint compound which can comprise mixing a combination of water, preservative, and wax emulsion, or silicone, or siliconate, or a fluorinated compound, or stearate, or combinations thereof to form a water-resistant joint compound.

In some embodiments, the joint compound can comprise a wax emulsion and can have a contact angle of about 90 to about 130 degrees, a pH below 9, and a Cobb value of about 5.0 to about 200 grams per square meter.

In some embodiments, the joint compound can further comprise about 20 to about 55 wt. % water, about 0.02 to about 1.0 wt. % preservatives, about 10 to about 50 wt. % calcium carbonate, about 0.0 to about 10% mica, about 0.0 to about 10 wt. % attapulgite clay, about 0.0 to about 10 wt. % talc, about 0.0 to about 40 wt. % perlite, about 0.0 to about 10 wt. % polyethylene oxide, about 0.0 to about 10 wt. % polyether siloxane, about 0.1 to about 20 wt. % wax emulsion, about 0.5 to about 10 wt. % latex binder, and about 0.1 to about 8.0 wt. % cellulose ether thickener.

In some embodiments, the joint compound can further comprise a rheology modifier, a binder, a thickener, and a filler. In some embodiments, the joint compound can further comprise calcium carbonate, or cristobalite, or a micro-roughened filler, or gypsum, or mica, or clay, or thickener, or a latex binder, or talc, or perlite, or expanded perlite, or combinations thereof. In some embodiments, the joint compound can comprise wax emulsion stabilized with polyvinyl alcohol. In some embodiments, the joint compound can comprise wax emulsion comprising synthetic wax. In some embodiments, the joint compound can comprise wax emulsion, the wax emulsion can comprise synthetic wax including polyethylene glycol or methoxypolyethylene glycol, or both polyethylene glycol and methoxypolyethylene glycol.

In some embodiments, the joint compound can comprise synthetic wax at about 0.1% to about 8% of the joint compound dry weight.

In some embodiments, the joint compound can comprise wax emulsion and silicones, or siloxanes, or siliconates, or fluorinated compounds, or stearates, or combinations thereof.

In some embodiments, the joint compound can comprise wax emulsion, the wax emulsion can be formed by mixing a combination of water, polyvinyl alcohol, and paraffin wax, or montan wax, or synthetic wax, or combinations thereof.

In some embodiments, an acid is not used in forming the water-resistant joint compound. In some embodiments, the joint compound can have a contact angle of about 60 to about 130 degrees.

In some embodiments, the joint compound can further comprise about 5.89 wt. % latex binder, about 34.60 wt. % water, about 7.36 wt. % wax emulsion, about 1.84 wt. % attapulgite clay, about 7.36 wt. % mica, about 33.86 wt. % calcium carbonate, and about 8.47 wt. % expanded perlite.

In some embodiments, the wax emulsion can further comprise about 58 wt. % water, about 2.70 wt. % polyvinyl alcohol, about 34.30 wt. % paraffin wax, and about 3.50 wt. % montan wax.

In some embodiments, the joint compound can comprise a wax emulsion and silicones, or siliconates, or fluorinated compounds, or stearates, or combinations thereof. In some embodiments, the silicones, siliconates, fluorinated compounds, or stearates can be selected from the group consisting of metal siliconate salts, potassium siliconate, poly hydrogen methyl siloxane, polydimethyl siloxane, stearate-based salts, and combinations thereof.

In some embodiments, the joint compound can comprise the wax emulsion, and at least one siliconate and optionally at least one thickener, preferably a cellulose ether based thickener.

BRIEF DESCRIPTION OF THE DRAWINGS

The disclosed aspects will hereinafter be described in conjunction with the appended drawings, provided to illustrate and not to limit the disclosed aspects, wherein like designations denote the elements.

DETAILED DESCRIPTION OF ILLUSTRATIVE EMBODIMENTS

Figure 1:
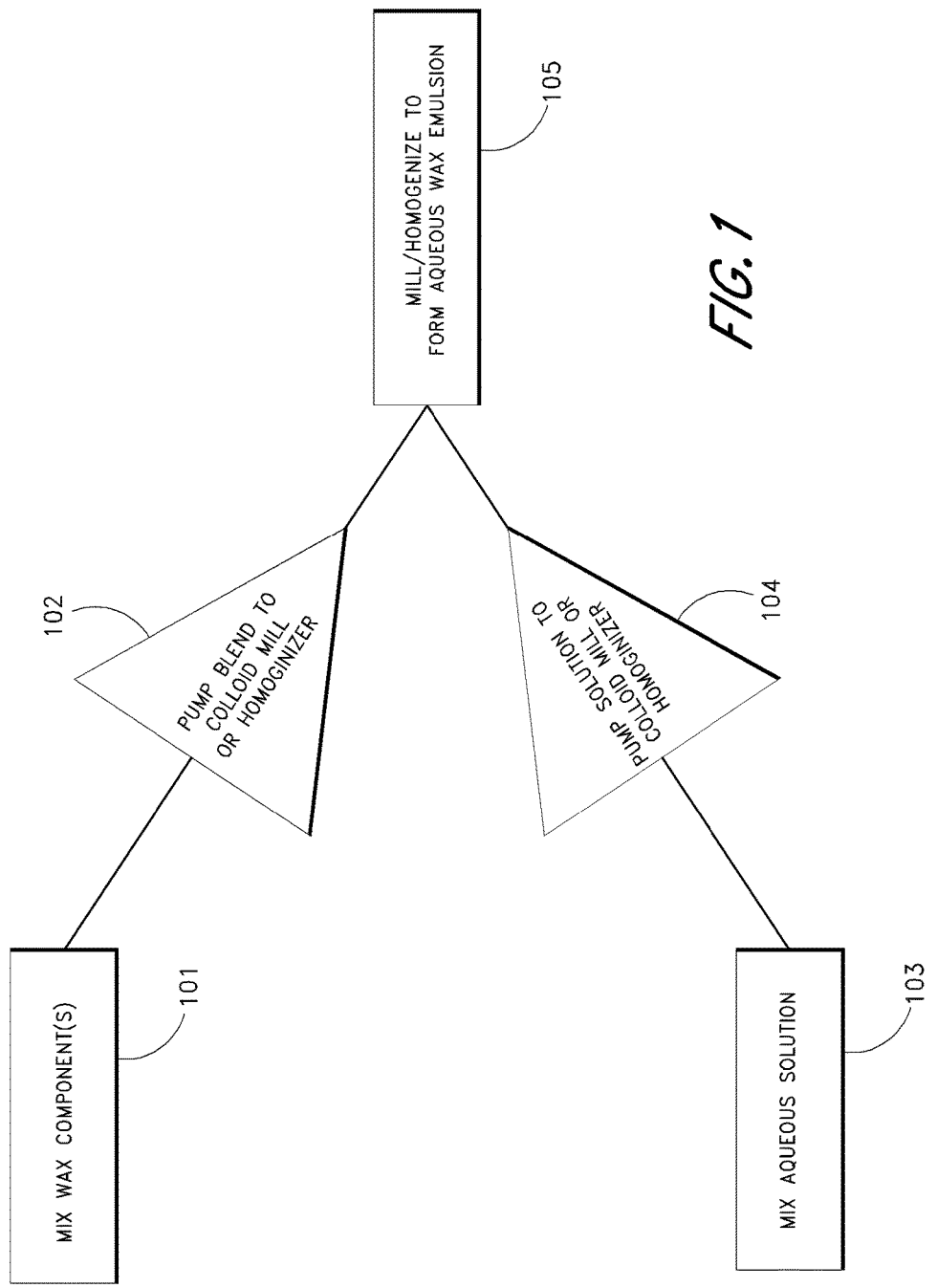
FIG. 1 illustrates an example process of one embodiment of the disclosure.

Embodiments of the present disclosure provide a water-resistant joint compound formed from a wax emulsion. The joint compound may optionally be used to create a water resistant barrier at wall joints, as well as at holes, such as nail holes, through a wall, thereby preventing moisture from passing through the walls. The joint compound may optionally be used, for example, in construction of houses or commercial buildings. The joint compound can contain, in some embodiments, a montan activated and polyvinyl alcohol stabilized wax emulsion. By doing so, the resulting dried joint compound surface can exhibit a high contact angle, which can lead to exceptional water repellency. Further, the disclosed joint compound formed from a wax emulsion can avoid deleterious effects on key desirable performance properties of the joint compound.

The joint compound can be used to create a moisture resistant joint compound that can, for example, complement and be used on moisture resistant gypsum boards ("green" boards). These boards, along with the joint compound, can be used in high humidity areas, such as bathrooms. The use of the moisture resistant boards and joint compounds can help to reduce the susceptibility of the walls, and the studs behind the walls, to mold growth and structural deformation caused through the absorption of water, reducing damage and health risks.

Certain example embodiments of the joint compound can be generally prepared from an improved wax emulsion, among other materials and additives. More details on example embodiments of the different materials are disclosed herein.

Wax Emulsions Including Moisture Resistant Stabilizers

Embodiments of an improved wax emulsion for use in a water-resistant joint compound are now described in greater detail, as follows. An embodiment of the wax emulsion may comprise water, a base, one or more waxes optionally selected from the group consisting of slack wax, paraffin wax, and a polymeric stabilizer, such as ethylene-vinyl alcohol-vinyl acetate terpolymer or polyvinyl alcohol. Further, montan wax, carnauba wax, sunflower wax, tall oil, tallow wax, rice wax, and any other natural or synthetic wax or emulsifiers containing organic acids (such as, for example, stearic acid) and/or esters can be used to form the wax emulsion.

Water may be provided to the emulsion, for example in amounts of about 30% to about 60% by weight of the emulsion. The solids content of the wax emulsion can be about 40% to about 70% by weight of the emulsion. Other amounts may be used.

In some embodiments, a dispersant and/or a surfactant may be employed in the improved wax emulsions. Optional dispersants, include, but are not limited to those having a sulfur or a sulfur-containing group(s) in the compound such as sulfonic acids (R—S(=O)2-OH) and their salts, wherein the R groups may be otherwise functionalized with hydroxyl, carboxyl or other useful bonding groups. In some embodiments, higher molecular weight sulfonic acid compounds such as lignosulfonate, lignosulfonic acid, naphthalene sulfonic acid, the sulfonate salts of these acids and derivatized or functionalized versions of these materials are used in addition or instead. An example lignosulfonic acid salt is Polyfon® H available from MeadWestvaco Corporation, Charleston, S.C. Other dispersants may be used, such as magnesium sulfate, polycarboxylate technology, ammonium hepta molybdate/starch combinations, non-ionic surfactants, ionic surfactants, zwitterionic surfactants and mixtures thereof, alkyl quaternary ammonium montmorillonite clay, etc. Similar materials may also be used, where such materials may be compatible with and perform well with the formulation components. For example, other materials may be used such that the edge swell, water absorption, internal bonding and/or flexural strength properties of the resultant boards are not materially affected and the resultant boards are acceptable for use as industry acceptable wallboard. If used, a dispersant and/or surfactant may comprise about 0.01% to about 5.0% by weight of the improved wax emulsion formulation composition, preferably about 0.1% to about 2.0% by weight of the improved wax emulsion formulation composition. Other concentrations may be used.

The wax component of the emulsion may include at least one wax which may be slack wax. The total wax content may be about 30% to about 60%, more preferably about 30% to about 40% by weight of the emulsion. Slack wax may be any suitable slack wax known or to be developed which incorporates a material that is a higher petroleum refining fraction of generally up to about 20% by weight oil. In addition to, or as an alternative to slack wax, paraffin waxes of a more refined fraction are also useful within the scope of the disclosure.

Suitable paraffin waxes may be any suitable paraffin wax, and preferably paraffins of melting points of from about 40° C. to about 110° C., although lower or higher melting points may be used if drying conditions are altered accordingly using any techniques known or yet to be developed in the composite board manufacturing arts or otherwise. Thus, petroleum fraction waxes, either paraffin or microcrystalline, and which may be either in the form of varying levels of refined paraffins, or less refined slack wax may be used. Optionally, synthetic waxes such as ethylenic polymers or hydrocarbon types derived via Fischer-Tropsch synthesis may be included in addition or instead, however paraffins or slack waxes are preferred in certain embodiments. By way of further example, synthetic waxes, such as polyethylene glycol, methoxypolyethylene glycol, or combinations thereof may be included. An example of a polyethylene glycol is PEG 1500, while an example of methoxypolyethylene glycol is MPEG 750 LD, both manufactured by Clariant International Ltd.

Montan wax, which is also known in the art as lignite wax, is a hard, naturally occurring wax that is typically dark to amber in color (although lighter, more refined montan waxes are also commercially available). Montan is insoluble in water, but is soluble in solvents such as carbon tetrachloride, benzene and chloroform. In addition to naturally derived montan wax, alkyl acids and/or alkyl esters which are derived from high molecular weight fatty acids of synthetic or natural sources with chain lengths preferably of over 18 carbons, more preferably from 26 to 46 carbons that function in a manner similar to naturally derived montan wax are also within the scope of the disclosure and are included within the scope of "montan wax" as that term is used herein unless the context indicates otherwise (e.g., "naturally occurring montan wax"). Such alkyl acids are generally described as being of formula R—COOH, where R is an alkyl non-polar group which is lipophilic and can be from 18 to more than 200 carbons. An example of such a material is octacosanoic acid and its corresponding ester which is, for example, a di-ester of that acid with ethylene glycol. The COOH group forms hydrophilic polar salts in the presence of alkali metals such as sodium or potassium in the emulsion. While the alkyl portion of the molecule gets embedded within the paraffin, the acid portion is at the paraffin/aqueous medium interface, providing stability to the emulsion. Other components which may be added include esterified products of the alkyl acids with alcohols or glycols.

In some embodiments, the at least one wax component of the emulsion includes primarily and, preferably completely a slack wax component. In some embodiments, the at least one wax component is made up of a combination of paraffin wax and montan wax or of slack wax and montan wax. Although it should be understood that varying combinations of such waxes can be used, and the combinations are not limiting. When using montan wax in combination with one or more of the other suitable wax components, it is preferred that montan be present in an amount of about 0.1% to about 10%, more preferably about 1% to about 4% by weight of the wax emulsion with the remaining wax or waxes present in amounts of from about 30% to about 50%, more preferably about 30% to about 35% by weight of the wax emulsion.

In some embodiments, the wax emulsion can include polyvinyl alcohol (PVOH) of any suitable grade which is at least partially hydrolyzed. The preferred polyvinyl alcohol is at least 80%, and more preferably at least 90%, and most preferably about 97-100% hydrolyzed polyvinyl acetate. Suitably, the polyvinyl alcohol is soluble in water at elevated temperatures of about 60° C. to about 95° C., but insoluble in cold water. The hydrolyzed polyvinyl alcohol is preferably included in the emulsion in an amount of up to about 5% by weight, preferably 0.1% to about 5% by weight of the emulsion, and most preferably about 2% to about 3% by weight of the wax emulsion.

In some embodiments, the stabilizer comprises a polymer that is capable of hydrogen bonding to the carboxylate or similar moieties at the water/paraffin interface. Polymers that fit the hydrogen-bonding requirement would have such groups as hydroxyl, amine, and/or thiol, amongst others, along the polymer chain. Reducing the polymer's affinity for water (and thus, its water solubility) could be achieved by inserting hydrophobic groups such as alkyl, alkoxy silanes, or alkyl halide groups into the polymer chain. The result may be a polymer such as ethylene-vinyl acetate-vinyl alcohol terpolymer (where the vinyl acetate has been substantially hydrolyzed). The vinyl acetate content may be between 0% to 15%. In some embodiments, the vinyl acetate content is between 0% and 3% of the terpolymer chain. The ethylene-vinyl alcohol-vinyl acetate terpolymer may be included in the emulsion in an amount of up to about 10.0% by weight, preferably 0.1% to about 5.0% by weight of the emulsion. In some embodiments, ethylene-vinyl alcohol-vinyl acetate terpolymer may be included in the emulsion in an amount of about 2% to about 3% by weight of the wax emulsion. An example ethylene-vinyl alcohol-vinyl acetate terpolymer that is available is the Exceval AQ4104™, available from Kuraray Chemical Company.

The wax emulsion may include a stabilizer material (e.g., PVOH, ethylene-vinyl alcohol-vinyl acetate terpolymer as described above). The stabilizer may be soluble in water at elevated temperatures similar to those disclosed with reference to PVOH (e.g., about 60° C. up to about 95° C.), but insoluble in cold water. The active species in the wax component (e.g., montan wax) may be the carboxylic acids and esters, which may comprise as much as 90% of the wax. These chemical groups may be converted into carboxylate moieties upon hydrolysis in a high pH environment (e.g., in an environment including aqueous KOH). The carboxylate moieties may act as a hydrophilic portion or "head" of the molecule. The hydrophilic portions can directly interface with the surrounding aqueous environment, while the rest of the molecule, which may be a lipophilic portion or "tail", may be embedded in the wax.

A stabilizer capable of hydrogen bonding to carboxylate moieties (e.g., PVOH or ethylene-vinyl alcohol-vinyl acetate terpolymer as described above) may be used in the wax emulsion. The polar nature of the carboxylate moiety may offer an optimal anchoring point for a stabilizer chain through hydrogen bonding. When stabilizer chains are firmly anchored to the carboxylate moieties as described above, the stabilizer may provide emulsion stabilization through steric hindrance. In embodiments where the wax emulsion is subsequently dispersed in a wallboard (e.g., gypsum board) system, all the water may be evaporated away during wallboard manufacture. The stabilizer may then function as a gate-keeper for repelling moisture. Decreasing the solubility of the stabilizer in water may improve the moisture resistance of the wax emulsion and the wallboard. For example, fully hydrolyzed PVOH may only dissolve in heated, and not cool, water. For another example, ethylene-vinyl alcohol-vinyl acetate terpolymer may be even less water soluble than PVOH. The ethylene repeating units may reduce the overall water solubility. Other stabilizer materials are also possible. For example, polymers with hydrogen bonding capability such as those containing specific functional groups, such as alcohols, amines, and thiols, may also be used. For another example, vinyl alcohol-vinyl acetate-silyl ether terpolymer can be used. An example vinyl alcohol-vinyl acetate-silyl ether terpolymer is Exceval R-2015, available from Kuraray Chemical Company. In some embodiments, combinations of stabilizers are used.

In some embodiments, the wax emulsion comprises a base. For example, the wax emulsion may comprise an alkali metal hydroxide, such as potassium hydroxide or other suitable metallic hydroxide, such as aluminum, barium, calcium, lithium, magnesium, sodium, r zinc hydroxide, and/or metal siliconates. These materials may serve as saponifying agents. Non-metallic bases such as derivatives of ammonia as well as amines (e.g., monoethanoline, diethanol or triethanol amine) can also be used. In some embodiments, potassium siliconate or imidazole could be used as a base. Combinations of the above-mentioned materials are also possible. If included in the wax emulsion, potassium hydroxide is preferably present in an amount of 0% to 1%, more preferably about 0.1% to about 0.5% by weight of the wax emulsion.

In some embodiments, an exemplary wax emulsion comprises: about 30% to about 60% by weight of water; about 0.1% to about 5% by weight of a lignosulfonic acid or a salt thereof; about 0% to about 1% by weight of potassium hydroxide; about 30% to about 50% by weight of wax selected from the group consisting of paraffin wax, slack wax and combinations thereof; and about 0.1% to about 10% montan wax, and about 0.1 to 5% by weight of ethylene-vinyl alcohol-vinyl acetate terpolymer.

The wax emulsion may further include other additives, including without limitation additional emulsifiers and stabilizers typically used in wax emulsions, flame retardants, lignocellulosic preserving agents, fungicides, insecticides, biocides, waxes, sizing agents, fillers, binders, additional adhesives and/or catalysts. Such additives are preferably present in minor amounts and are provided in amounts which will not materially affect the resulting composite board properties. Preferably no more than 30% by weight, more preferably no more than 10%, and most preferably no more than 5% by weight of such additives are present in the wax emulsion.

Shown in the below Table I is an example embodiments of a wax emulsion, although other quantities in weight percent may be used.

TABLE I

Example Wax Emulsion Composition

| Raw Material | Quantity in Weight Percent |
| --- | --- |
| Water | 58 |
| Polyvinyl alcohol | 2.70 |
| Dispersant (Optional) | 1.50 |
| Paraffin Wax | 34.30 |
| Montan Wax | 3.50 |
| Biocide | 0.02 |

Table II below shows another example of a wax emulsion. In this embodiment, stearic acid is used in place of montan wax.

TABLE II

Example Wax Emulsion Composition

| Raw Material | Quantity in Weight Percent |
| --- | --- |
| Water | 50.48% |
| Polyvinyl alcohol | 3.06% |
| Monoethanol amine | 0.08% |
| Paraffin Wax | 44.96% |
| Stearic Acid | 0.08% |
| Biocide | 0.02% |

The wax emulsion may be prepared using any acceptable techniques known in the art or to be developed for formulating wax emulsions, for example, the wax(es) are preferably heated to a molten state and blended together (if blending is required). A hot aqueous solution is prepared which includes any additives such as emulsifiers, stabilizers, etc., ethylene-vinyl alcohol-vinyl acetate terpolymer (if present), potassium hydroxide (if present) and lignosulfonic acid or any salt thereof. The wax is then metered together with the aqueous solution in appropriate proportions through a colloid mill or similar apparatus to form a wax emulsion, which may then be cooled to ambient conditions if desired.

In some embodiments, the improved wax emulsion may be incorporated with or coated on various surfaces and substrates. For example, the improved wax emulsion may be mixed with gypsum to form a gypsum wallboard having improved moisture resistance properties.

For a general understanding of an example embodiment of the method of making the composition of the disclosure, reference is made to the flow diagram in FIG. 1. As shown in 101, first the wax components may be mixed in an appropriate mixer device. Then, as shown in 102, the wax component mixture may be pumped to a colloid mill or homogenizer. As demonstrated in 103, in a separate step, water, and any emulsifiers, stabilizers, or additives (e.g., ethylene-vinyl alcohol-vinyl acetate terpolymer) are mixed. Then the aqueous solution is pumped into a colloid mill or homogenizer in 104. Steps 101 and 103 may be performed simultaneously, or they may be performed at different times. Steps 102 and 104 may be performed at the same time, so as to ensure proper formation of droplets in the emulsion. In some embodiments, steps 101 and 102 may be performed before step 103 is started. Finally, as shown in 105, the two mixtures from 102 and 104 are milled or homogenized to form an aqueous wax emulsion.

Some or all steps of the above method may be performed in open vessels. However, the homogenizer, if used, may use pressure in its application.

Advantageously in some embodiments, the emulsion, once formed, is cooled quickly. By cooling the emulsion quickly, agglomeration and coalescence of the wax particles may be avoided.

In some embodiments the wax mixture and the aqueous solution are combined in a pre-mix tank before they are pumped into the colloid mill or homogenizer. In other embodiments, the wax mixture and the aqueous solution may be combined for the first time in the colloid mill or homogenizer. When the wax mixture and the aqueous solution are combined in the colloid mill or homogenizer without first being combined in a pre-mix tank, the two mixtures may advantageously be combined under equivalent or nearly equivalent pressure or flow rate to ensure sufficient mixing.

In some embodiments, once melted, the wax emulsion is quickly combined with the aqueous solution. While not wishing to be bound by any theory, this expedited combination may beneficially prevent oxidation of the wax mixture.

Water-Resistant Joint Compound

Embodiments of the disclosed wax emulsion can be used to form a water-resistant joint compound. The joint compound can be used to cover, smooth, or finish gaps in boards, such as joints between adjacent boards, screw holes, and nail holes. The joint compound can also be used for repairing surface defects on walls and applying texture to walls and ceilings amongst numerous other applications. The joint compound can also be specially formulated to serve as a cover coat on cement and concrete surfaces. The joint compound can be particularly useful in locations where there is high humidity, such as bathrooms, to prevent molding or other deleterious effects.

Wax emulsions can be particularly advantageous for use in a joint compound as compared to, for example, non-emulsified and/or non-stabilized waxes such as melted PEG M750. These non-emulsified waxes can impart severe deleterious effects on the adhesion properties of a joint compound. Therefore, if the non-emulsified wax is to be used at all, it must be added in very low levels. On the other hand, wax emulsions, such as those described herein, can advantageously increase the adhesion properties of a joint compound, at least due to the adhesive effects of the stabilizer, and thus can be added at higher dosage levels. The wax emulsions can then be useful as they can provide both low dust properties as well as water repellency to the joint compound. In some embodiments, the wax emulsion can act as a dedusting agent. The wax emulsion can soften or melt when friction is applied, such as during cutting or sanding. Accordingly, dust can be agglomerated by the softened wax emulsion, where it can be securely held.

Embodiments of the joint compound can be applied in thin layers to a surface. The joint compound can be applied by, for example, using a trowel or other straight edged tool. However, the application and thickness of the layers of joint compounds is not limiting. Further, multiple layers may be applied in order to obtain a smooth, attractive finished wall. The number or layers applied is not limiting. In some embodiments, each layer can be allowed to dry prior to application of the next layer. In some embodiments, a second layer can be applied when the first layer is only partially dried. In some embodiments, the joint compound can be spread over mesh or tape used to connect wallboards. In some embodiments, the joint compound may also be used to patch and texture interior walls. In some embodiments, the joint compound can be made of water, preservative, calcium carbonate, mica, clay, thickener, binder (e.g., latex binder), and a wax emulsion. In addition to a latex binder, other water soluble binders, such as polyvinyl alcohol, can be used as well. Other materials, such as talc, binders, fillers, thickening agents, preservatives, limestone, perlite, urea, defoaming agents, gypsum latex, glycol, and humectants can be incorporated into the joint compound as well or can substitute for certain ingredients (e.g., talc can be used in place of, or in addition to mica; gypsum can be used in place of, or in addition to calcium carbonate, etc.). In some embodiments, the calcium carbonate can be replaced either wholly or partially with a surface micro-roughened filler that can further enhance the joint compound's hydrophobicity. In some embodiments, Calcimatt™, manufactured by Omya AG, can be used. In some embodiments, cristobalite (silicon dioxide) such as Sibelite® M3000, manufactured by Quarzwekre, can be used. These fillers can be used alone or in combination.

In some embodiments, the joint compound can be mixed in water. This mixture can then be applied to a surface, e.g., hole or joint, and can be allowed to dry. Once the water evaporates from the mixture, a dry, relatively hard cementitious material can remain. In some embodiments, shrinkage may occur upon drying.

Figure 2:
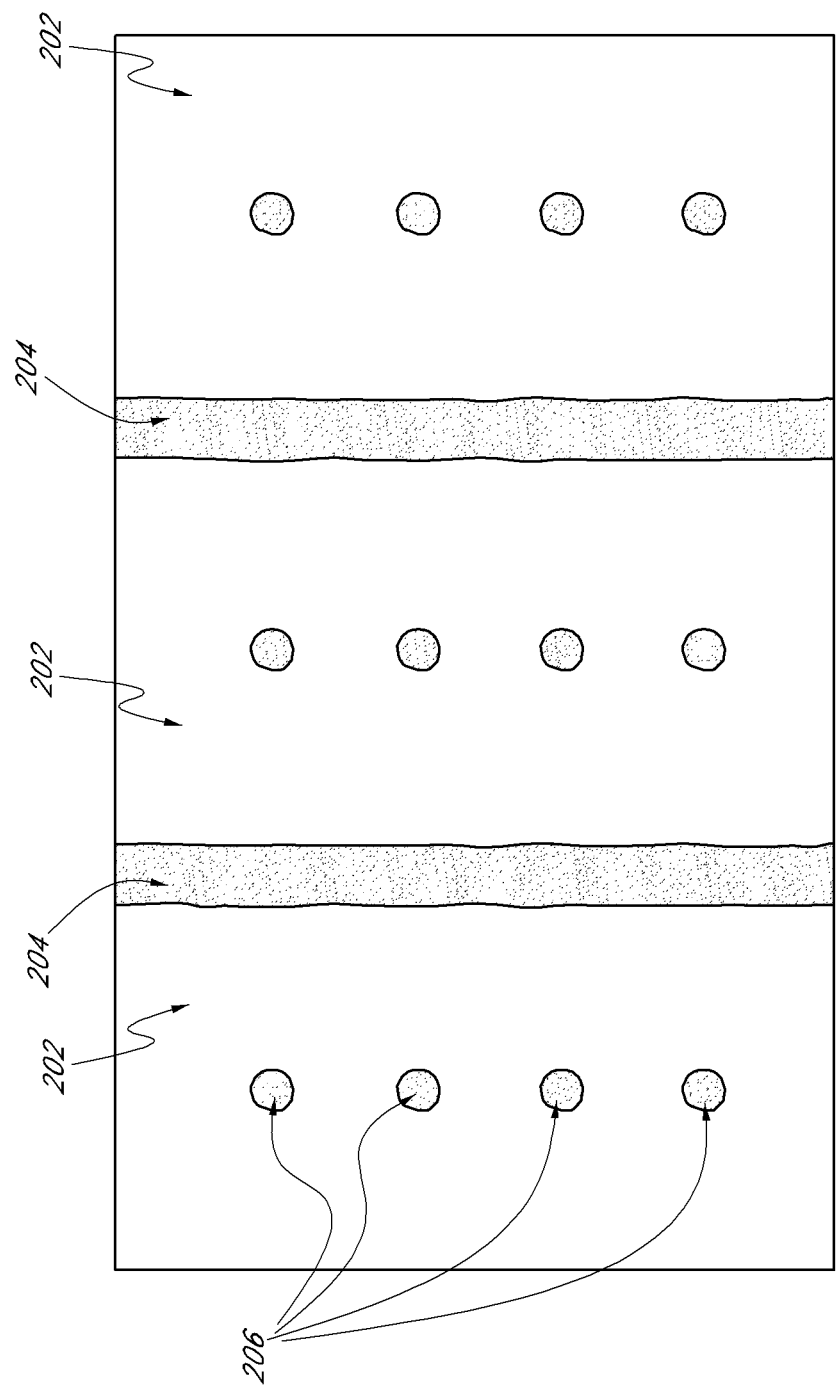
FIG. 2 illustrates a wall having an example embodiment of the disclosed water-resistant joint compound applied thereon.

FIG. 2 shows an example of a wall system incorporating an embodiment of a water-resistant joint compound. As shown, the wall system can be made of a plurality of boards 202. There is no limit to the amount of boards or the positioning of boards next to one another. Where two boards 202 are adjacent to one another, a gap, or joint, can be formed. While the boards 202 themselves may be water-resistant, the joints may allow for moisture to pass through. Therefore, embodiments of the water-resistant joint compound 204 can be spread across the joints. The compound 204 can be spread on the joint to completely cover the joint. In some embodiments, the boards 202 can also contain holes. These holes can be formed by nailing the boards 202 into studs, or other attachment means. Regardless of the reason for the hole, the compound 206 can also be used to cover the holes. The compound 206 can insert partial through the holes, or can cover the top of the holes, or both. The compound 206 can cover any fastener, e.g. a screw or nail, that is located in the hole. In some embodiments, compound 206 and 204 are the same compound. The application and thickness of the compound 204/206 on the boards 202 is not limiting, and common methods of application can be used.

An example formula range of an embodiment of a water-resistant joint compound using the above disclosed wax is shown in the below Table III:

TABLE III

Example Composition of a Water-Resistant Joint Compound

| Component | Range |
|---|---|
| Water | 20-55% |
| Preservatives | 0.02-1.0% |
| Calcium Carbonate | 10-50% |
| Mica | 0.5-10% |
| Attapulgite Clay | 0.2-10% |
| Talc | 0.0-10% |
| Perlite | 0.0-40% |
| Polyethylene oxide | 0.0-10% |
| Polyether siloxane | 0.0-10% |
| Wax emulsion | 0.1-20% |
| Latex binder | 0.5-10% |
| Cellulose ether thickener | 0.1-8.0% |

Further, an example of a specific formulation for a water-resistant joint compound can is shown in the below Table IV, although other weight percentages may be used:

TABLE IV

Example Composition of a Water-Resistant Joint Compound

| Compound | Wt. % |
|---|---|
| Preservative | 0.01 |
| Wetting Agent | 0.05 |
| Latex Binder | 5.89 |
| Water | 34.60 |
| Wax emulsion | 7.36 |
| Cellulose ether | 0.55 |
| Attapulgite clay | 1.84 |
| Mica | 7.36 |
| Calcium Carbonate | 33.86 |
| Expanded Perlite | 8.47 |

Another embodiment of a water-resistant ready-mix joint compound formula is shown in the below Table V. In this embodiment, an optional potassium siliconate additive is incorporated.

TABLE V

| Raw Material | Wt. % |
|---|---|
| Preservative | 0.20% |
| Latex (CPS 716) | 6.50% |
| Water | 36.70% |
| Wax Emulsion | 3.80% |
| Potassium Siliconate (Silres BS 16) | 0.20% |
| Cellulose Ether | 0.60% |
| Clay (Attagel 30) | 1.90% |
| Mica | 6.10% |
| Limestone (MW 100) | 35.20% |
| SilCel 43-34 | 8.80% |

The wax emulsion used in the joint compound can be formed from slack wax, montan wax, paraffin wax, carnauba wax, tall oil, sunflower wax, rice wax, and any other natural or synthetic wax containing organic acids and/or esters, or combinations thereof. For example, synthetic wax used in the joint compound may comprise ethylenic polymers or hydrocarbon types, optionally derived via Fischer-Tropsch synthesis, or combinations thereof. By way of further example, synthetic wax used in the joint compound may comprise polyethylene glycol, methoxypolyethylene glycol, or combinations thereof. Optionally, the synthetic waxes can be added in concentrations ranging from about 0.1% to about 8% of the dry weight of the joint compound or from about 0.5% to about 4.0% of the dry weight of the joint compound. In some embodiments, the wax emulsion is stabilized by polyvinyl alcohol.

In some embodiments, perlite can be used in a joint compound to, for example, control the density, shrinkage, and crack resistance of the joint compound. In some embodiments, perlite need not be used (e.g., where weight is not as much of a factor).

In some embodiments, mica can be used in a compound as well. Mica, which is a low bulk density mineral, may be used as a filler or extender, and may also improve crack resistance of the joint compound.

In some embodiments of the joint compound gypsum (calcium sulfate dihydrate) can also be used. Gypsum can be used to replace calcium carbonate, or can be used in conjunction with calcium carbonate. In some embodiments, talc can be included in a joint compound to, for example, enhance application properties and can also be used as a white extender pigment.

In some embodiments, clay can be used in a joint compound as, for example, a non-leveling agent and/or a thickening agent that can control the viscosity or rheology of the final product. Clay can also help enhance or create the water-holding properties of the joint compound.

In some embodiments, thickeners can be used to control the viscosity, affect the rheology, and affect the water holding characteristics of a joint compound. For example, cellulose ether can be used as a thickener.

In some embodiments, binders can be used in a joint compound to, for example, improve bonding to the substrate such as wallboard.

In some embodiments, a glycol can be used in a joint compound to provide functional properties to the joint compound such as wet edge, open time, controlling drying time, and freeze/thaw stability.

In some embodiments, other rheology modifiers can also be used in conjunction with, or instead of, some of the above described compositions.

In some embodiments, fillers can be used in the joint compound. For example, calcium carbonate, calcium sulfate hemihydrate, or calcium sulfate dehydrate can all be used as fillers, though other materials can be used as well. Further, thickeners, preservatives, binders, and other additives can be incorporated into the joint compound.

Other additives can also be added to the described joint compound in addition to the wax emulsion. In some embodiments, metal siliconate salts such as, for example, potassium siliconate, as well as silicone based compounds such as, for example, poly hydrogen methyl siloxane and polydimethyl siloxane, could provide advantageous water resistance to a joint compound. In some embodiments, fluorinated compounds and stearate-based salts could also be used to provide advantageous water resistance.

Any suitable siliconate may be used. Suitable examples of siliconates include, but are not necessarily limited to, NaOSi(OH)2(CH2)3NH2, NaO(OH)Si(CH3)(CH2)3NH2, KO0.5(HO)1.5Si(CH3)(CH2)3NH2, KOSi(OH)2(CH2)3NH2, LiO(OH)Si(CH3)(CH2)3NH2, and KO(HO)Si(CH3)(CH2)3NH2. Such siliconates are discussed in U.S. Pat. App. No. 20070028809 to Wacker et al, which is incorporated fully by reference herein.

In at least one embodiment, the siliconate is provided in an aqueous solution which is then mixed into the joint compound formulation. The siliconate solids in such aqueous solution is from about 10-70% by weight. In these embodiments, the siliconate may be present in the joint compound formulation in an amount of 0.010% to about 5%, based on the total weight of the joint compound formulation (on a dry basis, that is after the joint compound has been applied and dried). Stated another way, the siliconate may be present in the joint compound in an amount defined by any one of following numbers, by weight of the dried joint compound:

0.01, 0.02, 0.03, 0.04, 0.05, . . . 0.0.10, . . . , 0.20, . . . , 1.0, . . . , 2.0, . . . 5.0.

The siliconate can also be in an amount within a range defined by any two numbers above, including the endpoints.

In one embodiment, the latex binder used in the joint compound ranges from about 0.5 to about 10 wt. %. Stated another way, the latex binder may be present in the joint compound in an amount defined by any one of following numbers, by weight of the joint compound:

0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3.0, 3.1, 3.2, 3.3, 3.4, 3.5, 3.6, 3.7, 3.8, 3.9, 4.0, 4.1, 4.2, 4.3, 4.4, 4.5, 4.6, 4.7, 4.8, 4.9, 5.0, 5.1, 5.2, 5.3, 5.4, 5.5, 5.6, 5.7, 5.8, 5.9, 6.0, 6.1, 6.2, 6.3, 6.4, 6.5, 6.6, 6.7, 6.8, 6.9, 7.0, 7.1, 7.2, 7.3, 7.4, 7.5, 7.6, 7.7, 7.8, 7.9, 8.0, 8.1, 8.2, 8.3, 8.4, 8.5, 8.6, 8.7, 8.8, 8.9, 9.0, 9.1, 9.2, 9.3, 9.4, 9.5, 9.6, 9.7, 9.8, 9.9, and 10.0.

The latex binder can also be in an amount within a range defined by any two numbers above, including the endpoints. With the joint compound preparation above, this invention allows for a very small amount of latex binder being included in the joint compound but without any adverse impact to the physical characteristics of the joint compound. For example, the water repellency in fact improved for a joint compound in which the latex binder content was reduced. For example, in sample 3 (Table 1), 5.8% latex binder was used with 0.2% potassium siliconate, the contact angle was 91 and the Cobb value was 69. When the binder content was reduced to 4.0% by weight of the joint compound, the contact angle improved 20%, to 110, and the Cobb value by more than 95%. In one embodiment, the present invention envisions reducing the latex binder content progressively to achieve the desired contact angle as well as the Cobb value.

In at least one embodiment, the joint compound may comprise a cellulose ether, for example, a hydroxy-based cellulose ether. In at least one embodiment, the cellulose ether is present in the joint compound in an amount of 0.050 to 3.0 weight percent, based on the total weight of the joint compound. Stated another way, the cellulose ether may be present in the joint compound in an amount defined by any one of following numbers, by weight of the dried joint compound:

0.05, . . . 0.0.10, . . . , 0.20, . . . , 1.0, . . . , 2.0, . . . , 3.0.

The cellulose ether can also be in an amount within a range defined by any two numbers above, including the endpoints.

Any suitable cellulose ether may be used. Suitable examples of hydroxy-based cellulose ethers include, but are not necessarily limited to, hydroxyethyl cellulose ether, hydroxypropyl cellulose ether, hydroxyethyl methyl cellulose ether, hydroxypropyl methyl cellulose ether, carboxymethyl cellulose ether, methyl hydroxy cellulose ether, hydroxymethyl cellulose ether, and methylhydroxyethyl cellulose ether.

In at least one embodiment, suitable cellulose ether, for example, hydroxy-based cellulose ethers have a molecular weight of from 50,000 to 500,000, and preferably from 75,000 to 150,000, with a chain length of from 300 to 1500 repeating units, and more preferably from 400 to 700. Stated another way, the molecular weight of the cellulose ether can be any one of the following numbers:

50,000; 60,000; 70,000; 80,000; 90,000; 100,000; 110,000; 120,000; 130,000; 140,000; 150,000; 160,000; 170,000; 180,000; 190,000; 200,000; 210,000; 220,000; 230,000; 240,000; 250,000; 260,000; 270,000; 280,000; 290,000; 300,000; 310,000; 320,000; 330,000; 340,000; 350,000; 360,000; 370,000; 380,000; 390,000; 400,000; 410,000; 420,000; 430,000; 440,000; 450,000; 460,000; 470,000; 480,000; 490,000; and 500,000.

The molecular weight of the cellulose ether can also be within a range defined by any two numbers above, including the endpoints.

The cellulose ethers, for example, hydroxy-based cellulose ethers should also have a viscosity range of from 1000 to 100,000 cps, and more preferably from 2000 to 10,000 cps, as measured by 2% solution in water at 20° C., according to ASTM D 2363. Stated another way, the viscosity of the cellulose ether can be any one of the following numbers, measured in cp units:

1,000; 2,000; 3,000; 4,000; 5,000; 6,000; 7,000; 8,000; 9,000; 10,000; 11,000; 12,000; 13,000; 14,000; 15,000; 16,000; 17,000; 18,000; 19,000; 20,000; 21,000; 22,000; 23,000; 24,000; 25,000; 26,000; 27,000; 28,000; 29,000; 30,000; 31,000; 32,000; 33,000; 34,000; 35,000; 36,000; 37,000; 38,000; 39,000; 40,000; 41,000; 42,000; 43,000; 44,000; 450,000; 46,000; 47,000; 48,000; 49,000; 50,000; 51,000; 52,000; 53,000; 54,000; 55,000; 56,000; 57,000; 58,000; 59,000; 60,000; 61,000; 62,000; 63,000; 64,000; 65,000; 66,000; 67,000; 68,000; 69,000; 70,000; 71,000; 72,000; 73,000; 74,000; 75,000; 76,000; 77,000; 78,000; 79,000; 80,000; 81,000; 82,000; 83,000; 84,000; 85,000; 86,000; 87,000; 88,000; 89,000; 90,000; 91,000; 92,000; 93,000; 94,000; 950,000; 96,000; 97,000; 98,000; 99,000; and 100,000.

The molecular weight of the cellulose ether can also be within a range defined by any two numbers above, including the endpoints.

Hydroxy-based cellulose ethers such as these are normally identified by their viscosity rather than molecular weight.

In at least one embodiment, the cellulose ether is methyl cellulose ether, for example Methocel® manufactured by Dow Chemical Co. Methocel® products are available in two basic types: methylcellulose and hydroxypropyl methyl cellulose ether. Both types of Methocel have the polymeric backbone of cellulose, a natural carbohydrate that contains basic repeating structure of anhydroglucose units. Methylcellulose ether is made using only methyl chloride. Hydroxypropyl methylcellulose ether uses propylene oxide in addition to methyl chloride to obtain hydroxypropyl substitution on the anhydroglucose units. This substituent group, —OCH2CH(OH)CH3-, contains a secondary hydroxyl on the number two carbon and may be considered to form a propylene glycol ether of cellulose. These products possess varying ratios of hydroxypropyl and methyl substitution. The amount of substituent groups on the anhydroglucose units of cellulose can be designated by weight percent or by the average number of substituent groups attached to the ring, a concept known to cellulose chemists as "degree of substitution" (DS).

If all three available positions on each unit are substituted, the DS is designated as 3; if an average of two on each ring are reacted, the DS is designated as 2, etc. The number of substituent groups on the ring determines the properties of the various products. For example, Methocel® A cellulose ether contains 27.5 to 31.5% methoxyl, or a methoxyl DS of 1.64 to 1.92, a range that yields maximum water solubility. A lower degree of substitution gives products having lower water solubility, leading to products that are only soluble in caustic solutions. Higher degrees of substation produce methylcellulose products that are soluble only in organic solvents. In the Methocel E, F and K cellulose ether products, the methoxy substitution is still the major constituent. The molar substitution (MS) reports the number of moles of hydroxypropyl groups per mole of anhydroglucose. In the Methocel J and 310 series products, the hydroxypropyl substitution is about 50% of the total substitution. All these soluble methyl cellulose ethers can be used in embodiments of the present invention.

TABLE 1

Siliconate containing water resistant joint compound formulas

| Batch ID | Control | 1 | 2 | 3 | 4 |
|---|---|---|---|---|---|
| Acticide CBM2 | 0.1 | 0.1 | 0.1 | 0.1 | 0.1 |
| Fungitrol 404DS | 0.11 | 0.1 | 0.1 | 0.1 | 0.1 |
| Latex CPS 716 | 8.2 | 5.9 | 5.8 | 4.7 | 4.0 |
| Water | 40.8 | 40.4 | 37.3 | 37.7 | 38.0 |
| Wax Emulsion AQ484 | — | — | 3.1 | 3.1 | 3.1 |
| Potassium siliconate (Silres BS 16) | — | 1 | 0.2 | 0.2 | 0.2 |
| Cellulose ether (MOT 60000 YP4) | 0.5 | 0.6 | 0.4 | 0.4 | 0.4 |
| Cellulose ether (Methocel 240S) | — | — | 0.2 | 0.2 | 0.2 |
| Attagel 30 | 1.8 | 1.9 | 1.9 | 2.0 | 2.0 |
| 4K Mica | 7.2 | 7.4 | 6.2 | 6.3 | 6.3 |
| Calcium carbonate (Imerys MW 100) | 33 | 34.1 | 35.7 | 36.1 | 36.4 |
| Expanded perlite (SilCel 43-34) | 8.2 | 8.5 | 8.9 | 9.0 | 9.1 |
| Total wt. | 100 | 100 | 100 | 100 | 100 |
| Total solids | 54.9 | 55.6 | 56.3 | 56.5 | 56.5 |
| % Solids | 54.91% | 55.55% | 56.30% | 56.45% | 56.50% |
| % Active siliconate in wet compound | 0 | 0.34% | 0.07% | 0.07% | 0.07% |
| % Active siliconate in dry compound | 0 | 0.61% | 0.12% | 0.12% | 0.12% |

TABLE 1-continued

Siliconate containing water resistant joint compound formulas

| Batch ID | Control | 1 | 2 | 3 | 4 |
|---|---|---|---|---|---|
| Wt. fraction of wax solids in dry compound | 0 | 0 | 2.2% | 2.2% | 2.2% |
| Joint compound contact angle | 0 | 86 | 91 | 98 | 110 |
| Cobb values (unsanded, 30 mins.) | | | 69 | 7 | 3 |
| Cobb values (sanded, 30 mins.) | 482 | | 24 | 8 | 1 |

In some embodiments, the wax emulsion can be replaced by other materials (or used in combination with other materials) which may also increase the water repellency of the joint compound. For example, metal siliconate salts such as, for example, potassium siliconate, as well as silicone based compounds such as, for example, poly hydrogen methyl siloxane and polydimethyl siloxane, could be used in place of the wax emulsion (or in combination with the wax emulsion). In some embodiments, fluorinated compounds and stearate-based salts could also be used instead of the wax emulsion or in combination with the wax emulsion. The compounds described in this paragraph can be used alone as a replacement for wax emulsion, or can be used in combination with each other.

In some embodiments, the disclosed joint compound can cover a joint or hole and provide resistance to water penetration. Further, the joint compound is formulated to properly adhere to any boards that the compound is placed onto. With regards to adhesion, embodiments of the joint compound can have at least about 90%, 95%, 99%, or 100% bond according to an ASTM C474 peel test, hereby incorporated by reference in its entirety. Further, the joint compound can have adequate sag resistance, compatibility, and contact angle.

In some embodiments, the joint compound can provide water repellency. One indication of water repellency is the contact angle of a water droplet on the surface of the dried joint compound. A water droplet surface that has a contact angle of less than 90 degrees would generally be considered hydrophilic (the smaller the contact angle the greater the hydrophilicity). Conversely, surfaces that cause a water droplet to have a contact angle greater than 90 degrees are generally considered hydrophobic. Commercially available ready mix joint compound have contact angles of about zero degrees, meaning that a drop of water placed on such a surface will rapidly spread and wet out on the surface. Embodiments of the disclosed joint compound can have a contact angle greater than about 60, 70, 80, 90, 100, 110, 120, or 130. In some embodiments, the joint compound can have a contact angle between about 60 and 130, about 115 and 130, or about 118-120. Embodiments of the disclosed joint compound, containing a wax emulsion, can have an average contact angle of about 98 degrees (based on an average of six measurements), or greater than about 98 degrees, indicating a hydrophobic surface.

In some embodiments, the contact angle can be between about 60 to about 110 degrees, or about 60, about 70, about 80, about 90, about 100, or about 110 degrees.

In some embodiments, the contact angel can be any number selected from the following numbers in degrees:

60, 61, 63, 64, 65, 66, 67, 68, 69, 70, 71, 72, 73, 74, 75, 76, 77, 78, 79, 80, 81, 82, 83, 84, 85, 86, 87, 88, 89, 90, 91, 92, 93, 94, 95, 96, 97, 98, 99, 100, 101, 102, 103, 104, 105, 106, 107, 108, 109, 110, 111, 112, 113, 114, 115, 116, 117, 118, 119, 120, 121, 122, 123, 124, 125, 126, 127, 128, 129, and 130.

The contact angle can also be within a range defined by any two numbers above, including the endpoints.

This contact angle value can be modified, higher or lower, by adjusting the dosage level of the wax emulsion in the joint compound formula.

In some embodiments, the disclosed joint compound can be resistant to seepage of water into itself. This attribute can be generally determined by measuring the Cobb value of the compound. A Cobb value is a quantitative determination of how much water a substrate absorbs in a predetermined timeframe. For example, a leveled surface of an embodiment of the disclosed joint compound was applied on to a piece of commercially available regular ½" gypsum wallboard. When dried, the joint compound was sanded to a uniform ¼" thickness above the wallboard. A 100 cm2 Cobb testing ring was then fitted on top of the joint compound and the ring filled with 100 grams of water to begin the test. After two hours, the water was discarded and the Cobb ring disassembled. The wallboard/joint compound combo was then weighed to determine how much water was absorbed. This gram weight of water was multiplied by 100 to give the Cobb value of water absorbed per square meter. For a control joint compound (standard commercially available lightweight joint compound), the 30 minute Cobb value was 1406 grams of water per square meter. Commercially available lightweight joint compounds can have 30 minute Cobb values as high as 1600 grams per square meter. For comparison, the moisture resistant wallboard ("Green Board") upon which the joint compound is applied has a 30 minute Cobb value of less than 100. Hence, filling a joint with a joint compound with a Cobb value several times higher than that of the corresponding wallboard can effectively create a weak link. For more satisfactory protection of the wall system, the Cobb value of the joint compound can formulated to be similar to that of the wallboard.

For further comparison, a joint compound formula containing 6.7% of the wax emulsion had a 30 minute Cobb value of about 65 grams per square meter, which is significantly less absorbing. In some embodiments the disclosed joint compound can have a 30 minute Cobb value range of between about 5.0 to about 200 grams per square meter, or about 5.0, about 10, about 20, about 30, about 40, about 50, about 100, about 150, or about 200 grams per square meter. In some embodiments, the disclosed joint compound can have a 30 minute Cobb value range of less than about 200, less than about 150, less than about 100, less than about 50, less than about 40, less than about 30, or less than about 20 grams per square meter. In some embodiments, the disclosed joint compound can have a 30 minute Cobb value of about 50, about 100, about 150, about 200, about 300, about 400, or about 500 grams per square meter.

Water resistance of the joint compounds was also evaluated via an adapted/modified version of ASTM C473, hereby incorporated by reference in its entirety. In this method, a weighed sample is submerged in water for 2 hours after which it is taken out, excess water dabbed off and then weighed again. The increase in weight after submersion represents the amount of water absorbed by the sample. The less water that is absorbed, the more water resistant the compound would be.

A metal ring of 2.5" internal diameter (and ⅖" internal height) was placed on a silicone coated paper (for non-stick). A sample of conventional ready-mixed joint compound was then applied inside the ring such that it occupied the entire open volume of the ring. The conventional joint compound was allowed to dry on a lab bench overnight, then transferred into a forced air oven at 50° C. where drying was continued for another 5 hours (until constant weight) to form a patty. The same procedure was performed with the disclosed wax emulsion joint compound, forming a second patty. The patties were then lightly sanded all around (to ensure patty smoothness), weighed, and then submerged in a water bath in a manner similar to ASTM Method C473. To prevent sample flotation when in the water, a 100 gram weight was placed on each sample through the duration of the test. As in ASTM C473, the joint compound patties were removed from the water bath after 2 hours, excess water patted off, and weighed. The results of the testing are shown in the below Table VI.

TABLE VI

Testing Results

| Joint compound | % Water absorption | Sample condition |
|---|---|---|
| Sheetrock Lightweight Dust Control | 32% | Broke apart |
| Disclosed Joint Compound with 6.7% Wax Emulsion | 5.2% | Maintained structural and dimensional integrity |

While the commercial joint compound crumbled at the end of the test and could not be reused or retested, the patty containing the disclosed wax emulsion joint compound retained its structural and dimensional integrity. The patty containing the disclosed wax emulsion was in fact dried and then re-submerged to repeat the test. The second test gave a value of 5.4% and a third submersion test on the same sample gave a value of 4.0%. In some embodiments, the wax emulsion joint compound can have a % water absorbance from about 4 to about 6. In some embodiments, the wax emulsion joint compound can have a % water absorbance of about 6 or less, about 5.4 or less, about 5.2 or less, or about 4 or less. The structural and dimensional integrity of the wax emulsion containing patty remained intact and unchanged through the third testing cycle, suggesting that it could continue to survive multiple cycles of submersion and retesting. By contrast, the standard commercially available joint compound could not survive a single test cycle.

Standard joint compounds typically have a pH of 8-9, primarily as a result of the high calcium carbonate content. However, it can be undesirable for the pH of joint compound to be much higher than 9.0 because of the corrosive effects such high pH would have on worker's finishing tools as well as on the skin. Advantageously, the wax emulsion used in embodiments of the disclosed joint compound can have a pH of between 7.0 and 8.0, meaning that adding it as a component in a joint compound formulation does not result in an overall increase in the pH of the joint compound. This can advantageously be done without the addition of an acid. In some embodiments, an acid can be used. Accordingly, the pH of the joint compound can be about 7.0 or about 8.0, or below about 9.0 or below about 8.0.

In some embodiments, once the joint compound is applied, the compound may be sanded. This sanding can be generally done to smooth out the finish of the compound, or can be used to remove excess material. However, sanding of the joint compound can have an additional benefit in that the sanding can increase the overall adherence of paint, or other coating, onto the joint compound.

Water-Resistant Products

Embodiments of the disclosed wax emulsion can be used to form many different water-resistant products. For example, embodiments of the wax emulsion can be incorporated into building materials such as asphalt (e.g., comprising a viscous liquid or semi-solid form of petroleum), concrete (e.g., comprising aggregate or filler, cement, water, various chemical and/or mineral admixtures, etc.), stucco, cement (e.g., formed from or comprising calcium carbonate, clay, gypsum, fly ash, ground granulated blast furnace slag, lime and/or other alkalis, air entrainers, retarders, and/or coloring agents) or other binders. In some embodiments, the wax emulsion can be incorporated into concrete cover coat formulations, such as those used for filling, smoothing, and/or finishing interior concrete surfaces, drywall tape, bead embedment, skimcoating, and texturing drywall. Further, embodiments of the wax emulsion can be incorporated into concrete and/or cement mixtures as a water repellent additive. Therefore, embodiments of the wax emulsion can be incorporated into pourable concrete and/or cement that can be used, for example, for foundations in home constructions. Additionally, embodiments of the wax emulsion can be used in cinder blocks as well as other similar concrete or cement based products. In some embodiments, a water-resistant building material can be formed with cement, and wax emulsion, or silicone, or siloxane, or siliconate, or fluorinated compound, or stearate, or combinations thereof.

Embodiments of the wax emulsion can also be incorporated into boards, such as cement boards (e.g., a relatively thin board, comprising cement bonded particle boards and cement fiber (e.g., comprising cement, fillers, cellulose, mica, etc.), which may be 0.25-0.5 inch thick or which may be thicker or thinner), and/or cement board formulations. Therefore, the wax emulsion can be used to provide additional water resistance of the boards, and potentially prevent water or water vapor from penetrating the boards. In some embodiments, a water-resistant cement board can be formed with cement, and wax emulsion, or silicone, or siloxane, or siliconate, or fluorinated compound, or stearate, or combinations thereof, wherein the combination of cement and wax emulsion, or silicone, or siloxane, or siliconate, or fluorinated compound, or stearate, or combinations thereof is formed into the shape of a board.

Additionally, embodiments of the wax emulsion can be incorporated into paint and/or paint formulations (e.g. a liquid, liquefiable, or mastic composition that, after application to a substrate in a thin layer, converts to a solid film), such as paint that may be used to protect, color, or provide texture to a substrate. This can be done to impart water repellency, or water resistance, to the paint. The type of paint is not limiting, and embodiments of the wax emulsion can be incorporated into oil, water, acrylic, or latex based paints, including paints that may be pigmented to add color to the substrate on which the paint is applied. This water resistant paint can then be used on exterior and interior surfaces of buildings, as well as other products such as vehicles (e.g. cars, boats, and planes), toys, furniture. In some embodiments, a water-resistant paint can be formed comprising paint and wax emulsion, or silicone, or siloxane, or siliconate, or fluorinated compound, or stearate, or combinations thereof.

From the foregoing description, it will be appreciated that inventive devices and approaches for water resistant products and wax emulsions have been disclosed. While several components, techniques and aspects have been described with a certain degree of particularity, it is manifest that many changes can be made in the specific designs, constructions and methodology herein above described without departing from the spirit and scope of this disclosure.

Certain features that are described in this disclosure in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations, one or more features from a claimed combination can, in some cases, be excised from the combination, and the combination may be claimed as any subcombination or variation of any subcombination.

Moreover, while methods may be depicted in the drawings or described in the specification in a particular order, such methods need not be performed in the particular order shown or in sequential order, and that all methods need not be performed, to achieve desirable results. Other methods that are not depicted or described can be incorporated in the example methods and processes. For example, one or more additional methods can be performed before, after, simultaneously, or between any of the described methods. Further, the methods may be rearranged or reordered in other implementations. Also, the separation of various system components in the implementations described above should not be understood as requiring such separation in all implementations, and it should be understood that the described components and systems can generally be integrated together in a single product or packaged into multiple products. Additionally, other implementations are within the scope of this disclosure.

Conditional language, such as "can," "could," "might," or "may," unless specifically stated otherwise, or otherwise understood within the context as used, is generally intended to convey that certain embodiments include or do not include, certain features, elements, and/or steps. Thus, such conditional language is not generally intended to imply that features, elements, and/or steps are in any way required for one or more embodiments.

Conjunctive language such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

Language of degree used herein, such as the terms "approximately," "about," "generally," and "substantially" as used herein represent a value, amount, or characteristic close to the stated value, amount, or characteristic that still performs a desired function or achieves a desired result. For example, the terms "approximately", "about", "generally," and "substantially" may refer to an amount that is within less than or equal to 10% of, within less than or equal to 5% of, within less than or equal to 1% of, within less than or equal to 0.1% of, and within less than or equal to 0.01% of the stated amount.

Some embodiments have been described in connection with the accompanying drawings. The figures are drawn to scale, but such scale should not be limiting, since dimensions and proportions other than what are shown are contemplated and are within the scope of the disclosed inventions. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, it will be recognized that any methods described herein may be practiced using any device suitable for performing the recited steps.

While a number of embodiments and variations thereof have been described in detail, other modifications and methods of using and medical applications for the same will be apparent to those of skill in the art. Accordingly, it should be understood that various applications, modifications, materials, and substitutions can be made of equivalents without departing from the unique and inventive disclosure herein or the scope of the claims.

What is claimed:

1. A method of making a water-resistant joint compound comprising:
    mixing a combination of:
    water;
    a preservative;
    a wax emulsion wherein the wax emulsion comprises_paraffin wax, montan wax, carnauba wax, sunflower wax, rice wax, tallow wax, synthetic wax, wax containing organic acids, wax containing esters, or combinations thereof;
    at least one silicone, siliconate, fluorinated compound, stearate, or combinations thereof; and
    the wax emulsion is stabilized with polyvinyl alcohol and wherein the joint compound has a contact angle of about 60 to about 130 degrees; a pH below 12; and a Cobb value of about 1.0 to about 200 grams per square meter.

2. The method of making the joint compound of claim 1, wherein the joint compound comprises:
    about 20 to about 55 wt. % water;
    about 0.02 to about 1.0 wt. % preservatives;
    about 0.1 to about 20 wt. % wax emulsion; and further comprises
    about 10 to about 50 wt. % calcium carbonate;
    about 0.0 to about 10 wt. % mica;
    about 0.0 to about 10 wt. % attapulgite clay;
    about 0.0 to about 10 wt. % talc;
    about 0.0 to about 40 wt. % perlite;
    about 0.0 to about 10 wt. % polyethylene oxide;
    about 0.0 to about 10 wt. % polyether siloxane;
    about 0.5 to about 10 wt. % latex binder; and
    about 0.1 to about 8.0 wt. % cellulose ether thickener.

3. The method of making the joint compound of claim 1, wherein the joint compound further comprises a rheology modifier, a binder, a thickener, and a filler.

4. The method of making the joint compound of claim 1, wherein the joint compound further comprises calcium carbonate, cristobalite, a micro-roughened filler, gypsum, mica, clay, thickener, a latex binder, talc, perlite, expanded perlite, or combinations thereof.

5. The method of making the joint compound of claim 1, wherein the wax emulsion comprises water;
    paraffin wax, montan wax, or synthetic wax, or combinations thereof, and further comprises water, polyvinyl alcohol, a base, and a dispersant.

6. The method of making the joint compound of claim 1, wherein the joint compound comprises the synthetic wax at about 0.1% to about 8% of the joint compound dry weight.

7. The method of making the joint compound of claim 1, wherein the joint compound has a pH below 9.

8. The method of making the joint compound of claim 1, wherein the joint compound has a contact angle of about 90 to about 130 degrees.

9. The method of making the joint compound of claim 8, wherein the joint compound is hydrophobic and has a contact angle of about 110 to about 130 degrees.

10. The method of making the joint compound of claim 1, wherein the joint compound has a Cobb value of about 5.0 to about 200 grams per square meter.

11. The method of making the joint compound of claim 10, wherein the joint compound has a Cobb value of about 65 grams per square meter.

12. The method of making the joint compound of claim 1, wherein the joint compound further comprises surface micro-roughened fillers.

13. The method of making the joint compound of claim 1, wherein the joint compound comprises the synthetic wax at about 0.5% to about 4% of the joint compound dry weight.

14. The method of making the joint compound of claim 3, wherein the thickener comprises cellulose ether.

15. The method of making the joint compound of claim 5, wherein the base is monethanol amine, diethanol amine, triethanol amine, imidazole, or potassium siliconate.

16. The method of making the joint compound of claim 5, wherein the dispersant is a lignosulfonate.

* * * * *